(12) United States Patent
Harada et al.

(10) Patent No.: US 10,189,328 B2
(45) Date of Patent: Jan. 29, 2019

(54) VEHICULAR PUMP APPARATUS AND VEHICULAR BRACKET

(71) Applicant: HITACHI AUTOMOTIVE SYSTEMS, LTD., Ibaraki (JP)

(72) Inventors: Naofumi Harada, Yokohama (JP); Hiroshi Fukudome, Sagamihara (JP); Tsutomu Ito, Sagamihara (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 84 days.

(21) Appl. No.: 15/539,268

(22) PCT Filed: Dec. 24, 2015

(86) PCT No.: PCT/JP2015/085905
§ 371 (c)(1),
(2) Date: Jun. 23, 2017

(87) PCT Pub. No.: WO2016/104545
PCT Pub. Date: Jun. 30, 2016

(65) Prior Publication Data
US 2018/0015803 A1    Jan. 18, 2018

(30) Foreign Application Priority Data
Dec. 24, 2014   (JP) .................................. 2014-260552

(51) Int. Cl.
*F16M 1/00*        (2006.01)
*B60G 17/04*       (2006.01)
(Continued)

(52) U.S. Cl.
CPC .......... *B60G 17/0408* (2013.01); *B60G 11/27* (2013.01); *F04B 39/00* (2013.01);
(Continued)

(58) Field of Classification Search
CPC ...... F04B 39/00; F04B 39/14; F04B 39/0044; F04B 39/12; F16F 15/08; B60G 11/27;
(Continued)

(56) References Cited

U.S. PATENT DOCUMENTS 6,267,268 B1 *   7/2001   Quartarone .............. B67D 1/10
                                                      222/129.1
7,350,537 B2 *   4/2008   Honermann ......... A01C 23/008
                                                      137/343
(Continued)

FOREIGN PATENT DOCUMENTS

JP        63-183484       11/1988
JP         5-77640         3/1993
(Continued)

OTHER PUBLICATIONS

International Search Report dated Mar. 15, 2016 in International Application No. PCT/JP2015/085905.
(Continued)

Primary Examiner — Toan C To
(74) Attorney, Agent, or Firm — Wenderoth, Lind & Ponack, L.L.P.

(57) ABSTRACT

A bracket (11) has an annular portion (12) provided with a trapezoidal convex portion (13) extending from an inner peripheral edge (12C) to outer peripheral edge (12D) of the annular portion. The convex portion has a top region (13A), an outer wall-side falling region (13B), and an inner wall-side falling region (13C). The annular portion and one vehicle body mounting portion (17) are connected to each other through a non-linear connecting portion (20), and the annular portion and the other vehicle body mounting portion (18) are connected to each other through a non-linear connecting portion (21). This structure makes it possible to increase the moment of inertia of area of the annular portion and to increase the flexural rigidity of the bracket. Further, (Continued)

it is possible to suppress a problem that the connecting portion (20) and the connecting portion (21) become nodes of vibration.

9 Claims, 6 Drawing Sheets

(51) Int. Cl.
*F04B 39/00* (2006.01)
*F16F 15/08* (2006.01)
*B60G 11/27* (2006.01)
*F04B 39/12* (2006.01)
*F04B 39/14* (2006.01)

(52) U.S. Cl.
CPC .......... *F04B 39/0044* (2013.01); *F04B 39/12* (2013.01); *F04B 39/14* (2013.01); *F16F 15/08* (2013.01); *B60G 2202/15* (2013.01); *B60G 2204/20* (2013.01)

(58) Field of Classification Search
CPC ............ B60G 17/0408; B60G 2204/20; B60G 2202/15
USPC ...................... 280/124.16; 248/560, 671, 674
See application file for complete search history.

(56) References Cited

U.S. PATENT DOCUMENTS

| | | | |
|---|---|---|---|
| 9,467,020 B2* | 10/2016 | Billman | H02K 7/1166 |
| 10,030,657 B2* | 7/2018 | Tozawa | F04C 15/008 |
| 2003/0038469 A1* | 2/2003 | Chernoff | B60G 3/18 |
| | | | 280/781 |
| 2008/0142674 A1* | 6/2008 | Dang | F04B 39/12 |
| | | | 248/674 |
| 2008/0219865 A1 | 9/2008 | Hodapp et al. | |
| 2009/0185929 A1 | 7/2009 | Duppert et al. | |
| 2012/0049470 A1 | 3/2012 | Rositch et al. | |
| 2013/0075572 A1* | 3/2013 | Matsumoto | B60T 17/02 |
| | | | 248/560 |

FOREIGN PATENT DOCUMENTS

| | | |
|---|---|---|
| JP | 2007-92709 | 4/2007 |
| JP | 2011-510216 | 3/2011 |
| JP | 2014-47822 | 3/2014 |

OTHER PUBLICATIONS

Office Action dated Mar. 27, 2018 in Japanese Application No. 2016-566414, with English translation.

\* cited by examiner

VEHICULAR PUMP APPARATUS AND VEHICULAR BRACKET

TECHNICAL FIELD

The present invention relates to a vehicular pump apparatus installed in a vehicle, for example, a four-wheeled automobile, to compress air to be supplied to an air suspension or the like, and also relates to a vehicular bracket used to secure a pump apparatus.

BACKGROUND ART

In general, vehicles such as four-wheeled automobiles are equipped with an air suspension system for performing vehicle height adjustment. The air suspension system has an air suspension performing vehicle height adjustment in response to the supply and discharge of air, and an air compressor (compressor) producing compressed air to be supplied to the air suspension. The air compressor is secured to the frame of the vehicle body or the engine through a bracket.

As a method of securing the air compressor to the frame of the vehicle body or the engine, there has been disclosed a method wherein the housing of the air compressor is provided with a mounting part having a bolt receiving hole, and the mounting part is bolted to an engine bracket extending from the engine (for example, see Patent Literature 1).

According to the above-mentioned conventional technique, a plurality of ribs are provided between the mounting part of the housing and a bearing boss part, thereby making it possible to increase the rigidity of the mounting part of the housing and to suppress transmission of vibration of the air compressor to the engine bracket.

CITATION LIST

Patent Literature

Patent Literature 1: Japanese Patent Application Laid-Open Publication No. 2007-92709

SUMMARY OF INVENTION

Technical Problem

In the meantime, there are occasions where a sufficient space cannot foe ensured around the air compressor, depending on the layout of the vehicle body. In such a case, a plate-shaped bracket may be used to secure the air compressor to the vehicle body.

However, when a plate-shaped bracket is used to secure the air compressor to the vehicle body, the low-order natural frequency of the bracket decreases and may coincide with the vibration frequency of the air compressor. In such a case, the vibration of the air compressor is disadvantageously transmitted to the vehicle body in amplified form.

Therefore, it is necessary to increase the rigidity of the bracket in order to raise the natural frequency of the bracket. However, if the thickness of a plate material constituting the bracket is increased, the weight of the bracket increases undesirably.

On the other hand, it may be conceivable to provide a vibration-isolating member in a mounting region where the bracket and the air compressor are secured to each other, or in a mounting region where the bracket and the vehicle body are secured to each other. In this case, however, the number of parts increases, so that the air compressor mounting process becomes complicated, and the manufacturing cost increases.

The present invention has been made in view of the above-described problems of the conventional techniques, and an object of the present invention is to provide a vehicular pump apparatus configured to increase the rigidity of a bracket to thereby enable suppression of transmission of vibration from the pump to the vehicle body, and also to provide a vehicular bracket.

Solution to Problem

To solve the above-described problems, the present invention is applicable to a vehicular pump apparatus comprising a pump compressing a fluid and an annular bracket having at its inner peripheral side an annular portion to which the pump is secured and at its outer peripheral side a plurality of vehicle body mounting portions to be connected to a vehicle body. The annular portion of the bracket has a convex portion of convex cross-sectional shape provided along the annular portion, and a connecting portion between each of the vehicle body mounting portions and the annular portion has a non-linear shape.

The present invention is a vehicular bracket used to secure a pump compressing a fluid to a vehicle body of a vehicle. The bracket has at its inner peripheral side an annular portion to which the pump is secured and at its outer peripheral side a plurality of vehicle body mounting portions to be connected to a vehicle body. The annular portion has a convex portion of convex cross-sectional shape provided along the annular portion, and a connecting portion between each of the vehicle body mounting portions and the annular portion has a non-linear shape.

Advantages of Invention

According to the present invention, it is possible to increase the rigidity of the bracket without increasing the weight of the bracket, and hence possible to suppress transmission of vibration of the pump to the vehicle body.

DESCRIPTION OF EMBODIMENTS

A vehicular pump apparatus according to an embodiment of the present invention will be explained below in detail with reference to FIGS. 1 to 7, taking as an example a case where the vehicular pump apparatus is installed in a vehicle, e.g. a four-wheeled automobile.

Figure 1:
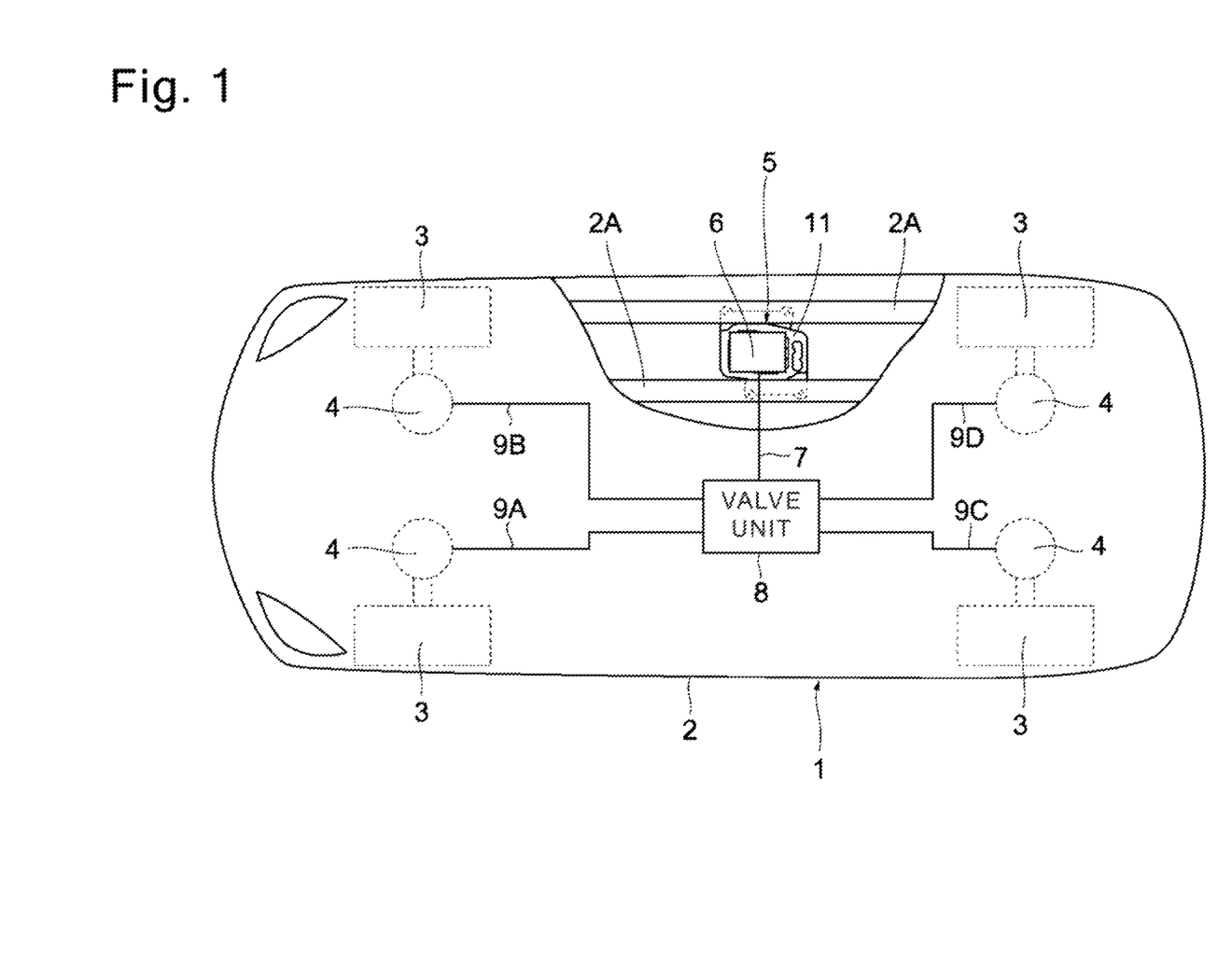
FIG. 1 is a schematic view of a vehicular pump apparatus according to an embodiment of the present invention, showing the way in which the pump apparatus is installed in a vehicle.

As shown in FIG. 1, a vehicle 1 has a vehicle body 2, wheels 3, air suspensions 4, a pump apparatus 5, and so forth.

The vehicle body 2 constitutes the body of the vehicle 1. The lower side of the vehicle body 2 is provided with a total of four wheels 3 comprising left and right front wheels and left and right rear wheels.

The air suspensions 4 are provided between the vehicle body 2 and the wheels 3, respectively. The four air suspensions 4 have air springs, respectively. The air spring of each air suspension 4 is supplied with and discharged of compressed air from an air compressor (described later), thereby performing vehicle height adjustment.

Figure 2:
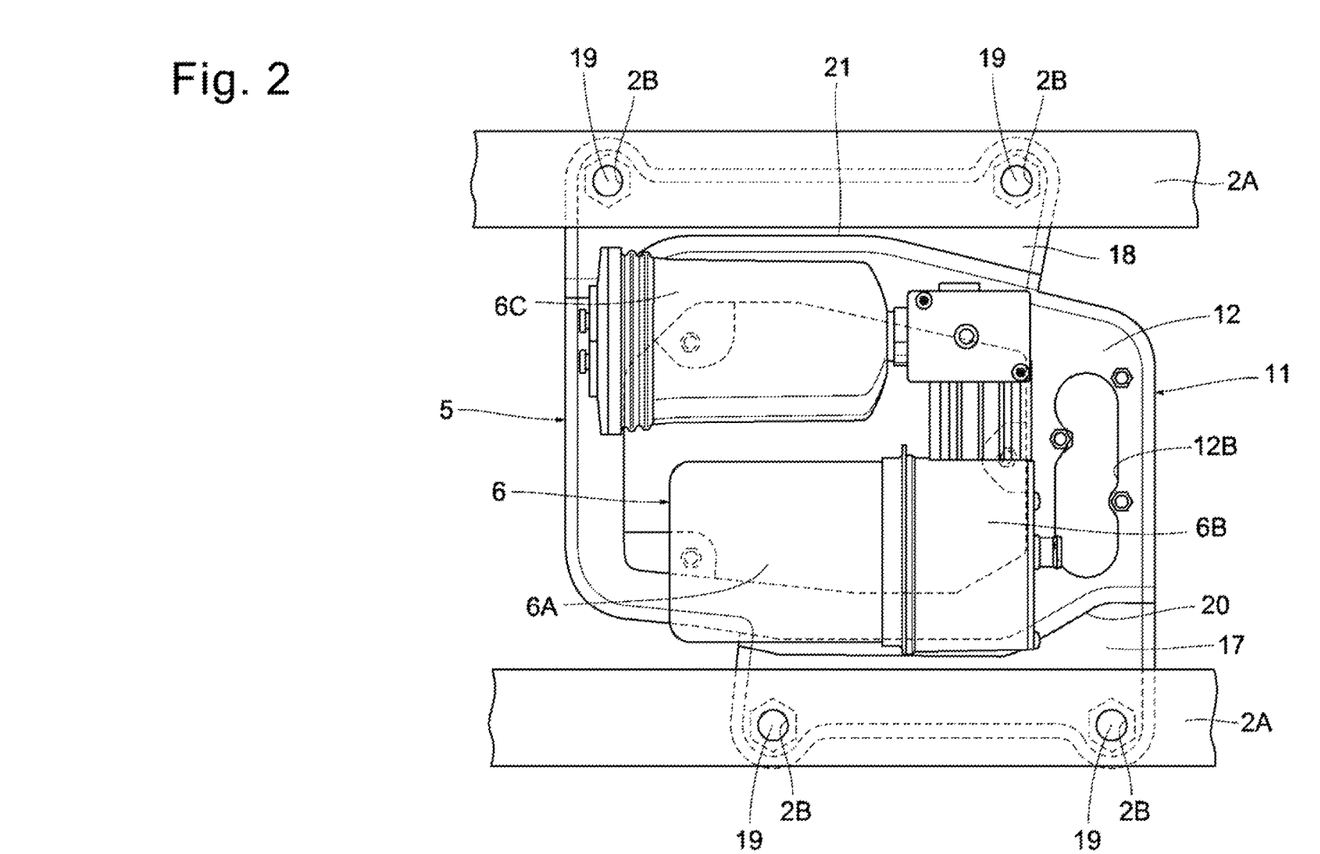
FIG. 2 is a plan view showing the way in which the pump apparatus is secured to a frame of a vehicle body.

As shown in FIG. 2, the pump apparatus 5 comprises an air compressor 6 as a pump compressing air, and a bracket 11 (described later) used to secure the air compressor 6 to a frame 2A of the vehicle body 2. The air compressor 6 is constructed by including an electric motor 6A, a compressor body 6B driven by the electric motor 6A to compress air, and an air dryer 6C removing water from the compressed air. The air compressor 6 is connected to a valve unit 8 through a supply-discharge line 7.

The valve unit 8 is connected to the air suspensions 4 through four branch lines 9A, 9B, 9C and 9D, respectively, branched from the supply-discharge line 7, and has supply-discharge valves (not shown) comprising electromagnetic valves opening and closing the branch lines 9A, 9B, 9C and 9D, respectively. The valve unit 8 is configured to open end close the supply-discharge valves in response to signals from a controller (not shown), thereby supplying and discharging compressed air to and from each air suspension 4 to perform vehicle height adjustment.

Next, the bracket 11 applied to this embodiment will be explained with reference to FIGS. 3 to 7.

Figure 3:
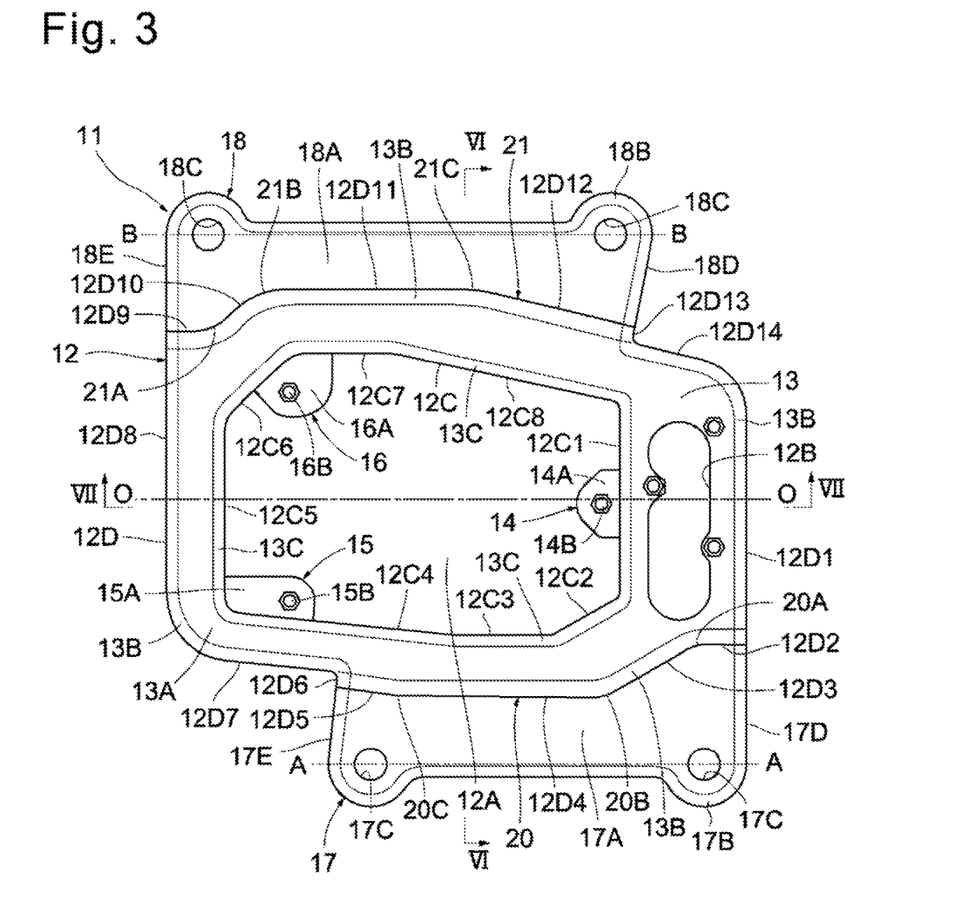
FIG. 3 is a plan view showing a bracket as a single element.
Figure 4:
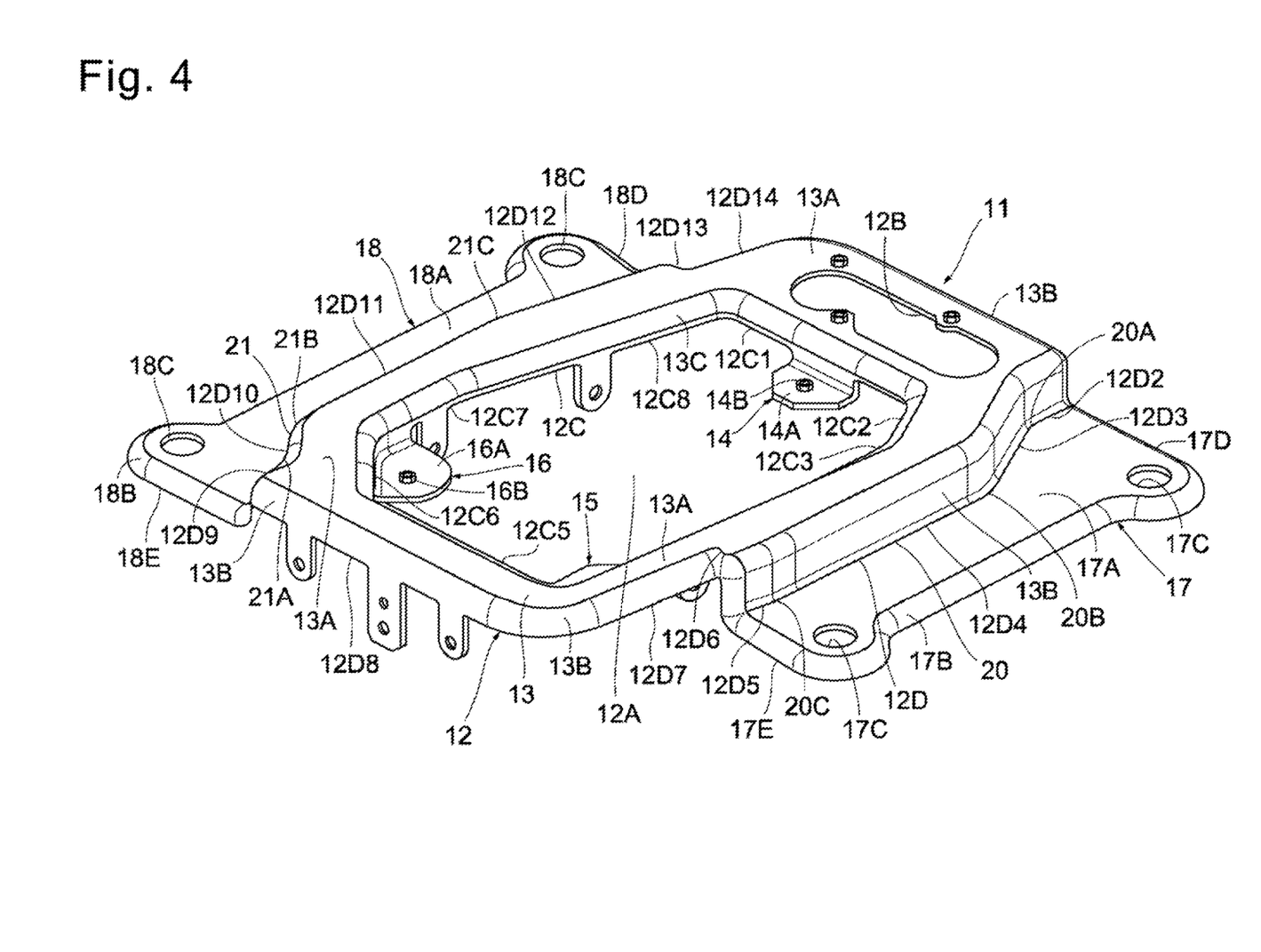
FIG. 4 is a perspective view from above showing the bracket as a single element.
Figure 5:
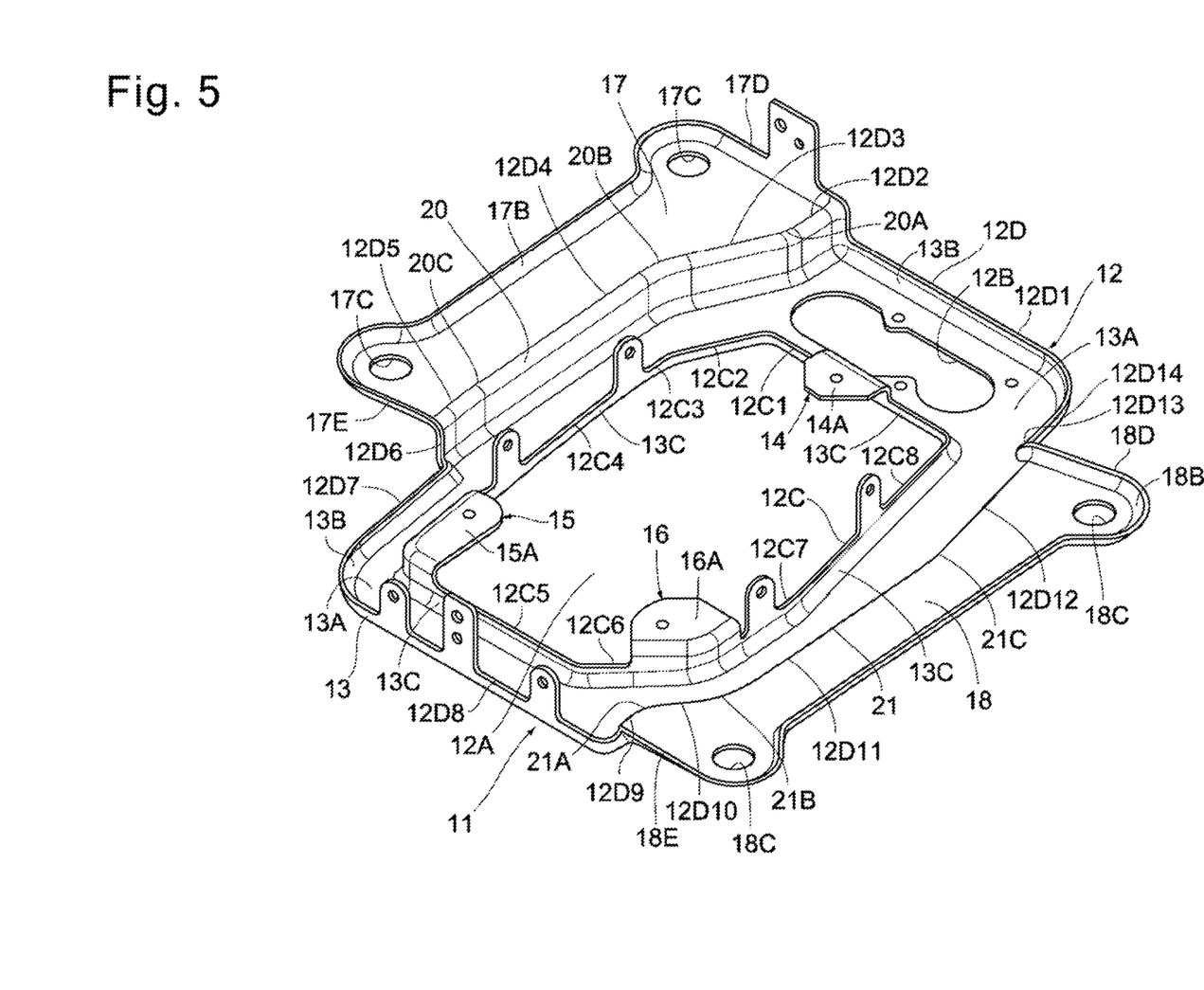
FIG. 5 is a perspective view from below showing the bracket as a single element.

The bracket 11 is used, to secure the air compressor 6 to the frame 2A of the vehicle body 2. The bracket 11 is formed by applying bending (press working) or the like to a single plate material, e.g. steel plate. It should be noted that examples of plate materials usable to form the bracket 11 include those made of aluminum, resin material, and so forth.

The bracket 11 is constructed by including an annular portion 12, compressor mounting portions 14, 15 and 16, and vehicle body mounting portions 17 and 18, which will be described later. These portions, i.e. annular portion 12, compressor mounting portions 14, 15 and 16, and vehicle body mounting portions 17 and 18, are integrally formed by applying bending (press working) to a single plate material.

The annular portion 12 is disposed in the center of the bracket 11. The annular portion 12 is provided at its inner peripheral side with a polygonal opening 12A. Further, the annular portion 12 has a device mounting slot (a device mounting elongated hole) 12B provided adjacent to the opening 12A.

The annular portion 12 has an inner peripheral edge 12C of a polygonal shape corresponding to the shape of the opening 12A. That is, the inner peripheral edge 12C is formed in a polygonal shape comprising a first, second, third, fourth, fifth, sixth seventh and eighth sides 12C1, 12C2, 12C3, 12C4, 12C5, 12C6, 12C7 and 12C8 different in length between adjacent ones thereof.

On the other hand, an outer peripheral edge 12D of the annular portion 12 has a polygonal shape corresponding to the overall shape of the opening 12A and the slot 12B. That is, the outer peripheral edge 12D is formed in a polygonal shape comprising a first, second, third, fourth, fifth, sixth, seventh, eighth, ninth, tenth, eleventh, twelfth, thirteenth and fourteenth sides 12D1, 12D2, 12D3, 12D4, 12D5, 12D6, 12D7, 12D8, 12D9, 12D10, 12D11, 12D12, 12D13 and 12D14 different in length between adjacent ones thereof.

Figure 6:
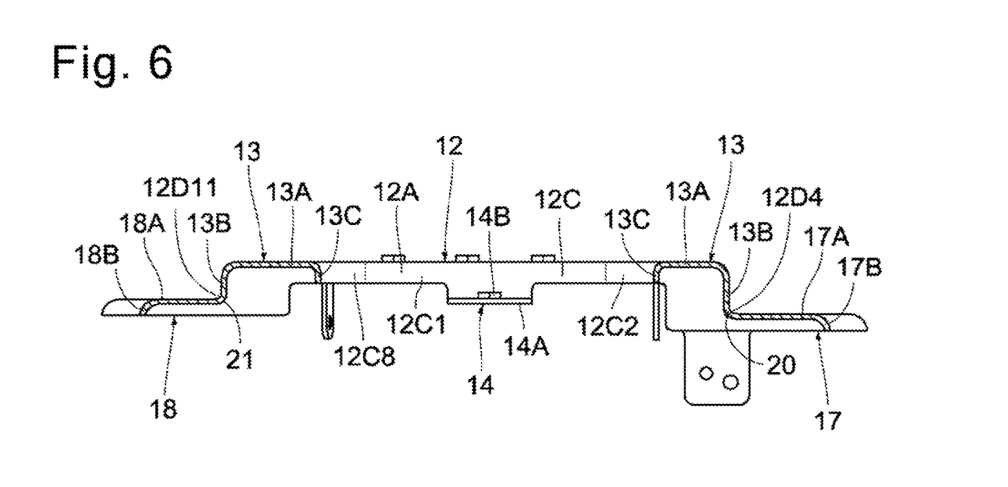
FIG. 6 is a sectional view of the bracket as seen from the direction of the arrow VI-VI in FIG. 3.
Figure 7:
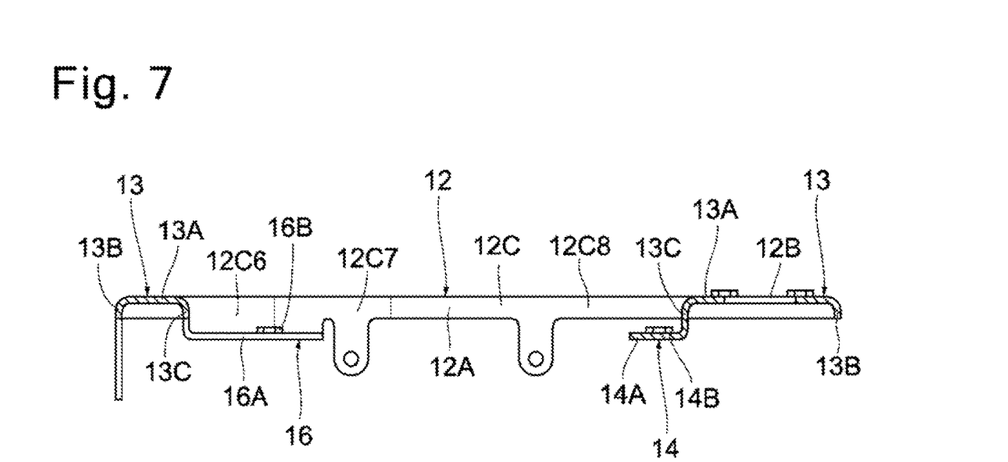
FIG. 7 is a sectional view of the bracket as seen from the direction of the arrow VII-VII in FIG. 3.

Here, as shown in FIGS. 6 and 7, the annular portion 12 is not planar at its region extending from the inner peripheral edge 12C to the outer peripheral edge 12D, but the annular portion 12 has at its region extending from the inner peripheral edge 12C to the outer peripheral edge 12D a convex portion 13 of upward convex cross-sectional shape provided along the entire circumference of the annular portion 12.

The convex portion 13 has a substantially trapezoidal cross-sectional shape and is formed over the entire circumference of the annular portion 12. That is, the convex portion 13 is formed in a substantially trapezoidal cross-sectional shape from a top region 13A formed as a flat surface extending over the entire circumference of the annular portion 12, an arcuate outer wall-side falling region 13B falling from the outer side of the top region 13A to form an outer wall surface, and an arcuate inner wall-side falling region 13C falling from the inner side of the top region 13A to form an inner wall surface.

Thus, the convex portion 13 has a folded structure integrally formed from the top region 13A, the outer wall-side falling region 13B, and the inner wall-side falling region 13C. That is, the convex portion 13 has a cross-sectional shape of a trapezoid (quadrangle) surrounded by the top region 13A comprising a flat surface, the outer wall-side falling region 13B folded downwardly from the outer side of the top region 13A, and the inner wall-side falling region 13C folded downwardly from the inner side of the top region 13A to face the outer wall-side falling region 13B across the top region 13A.

With the above-described structure, the moment of inertia of area of the annular portion 12 can be increased, and cross-sectional flexural rigidity can be increased, as compared to a structure in which the annular portion 12 is formed in a planar shape. In this structure, the convex portion 13 is provided over the entire circumference of the annular portion 12; therefore, the overall flexural rigidity of the bracket 11 can be increased.

The three compressor mounting portions 14, 15 and 16 are disposed at the inner peripheral edge 12C of the annular portion 12. These compressor mounting portions 14, 15 and 16 are provided on the inner wall-side falling region 13C of the convex portion 13 at appropriate mutual spaces to secure the air compressor 6 thereto.

Here, the compressor mounting portion 14 is disposed at the position of the first side 12C1 constituting the inner peripheral edge 12C of the annular portion 12. The compressor mounting portion 14 has a mounting surface 14A projecting horizontally from the lower end of the inner wall-side falling region 13C of the convex portion 13 toward the center of the opening 12A. The mounting surface 14A has a nut 14B fixed thereto by using welding or the like.

The compressor mounting portion 15 is disposed at a corner where the fourth and fifth sides 12C4 and 12C5 constituting the inner peripheral edge 12C of the annular portion 12 intersect each other. The compressor mounting portion 16 is disposed at a corner where the sixth and seventh sides 12C6 and 12C7 constituting the inner peripheral edge 12C of the annular portion 12 intersect each other. These compressor mounting portions 15 and 16 also have mounting surfaces 15A and 16A, respectively, projecting horizontally from the lower end of the inner wall-side falling region 13C of the convex portion 13, and the mounting surfaces 15A and 16A have nuts 15B and 16B fixed thereto, respectively, in the same way as the compressor mounting portion 14.

The compressor mounting portions 14, 15 and 16 are integrally formed with the convex portion 13, and the mounting surfaces 14A, 15A and 16A are disposed substantially in the same plane. The air compressor 6 is secured to the compressor mounting portions 14, 15 and 16 by using bolts (not shown) threadedly engaged with the nuts 14B, 15B and 16B, respectively.

The two vehicle body mounting portions 17 and 18 are provided on the outer peripheral edge 12D of the annular portion 12 in such a manner as to face each other across the annular portion 12. The one vehicle body mounting portion 17 is disposed at a position of the outer peripheral edge 12D of the polygonal annular portion 12 which corresponds to the second, third, fourth and fifth sides 12D2, 12D3, 12D4 and 12D5. The one vehicle body mounting portion 17 is connected to the outer wall-side falling region 13B of the convex portion 13 through a connecting portion 20 (described later).

The one vehicle body mounting portion 17 is formed as a planar portion extending in a direction away from the annular portion 12 as a whole. That is, the one vehicle body mounting portion 17 has a top surface 17A comprising a horizontally extending flat surface and an arcuate folded surface 17B of arcuate cross-sectional shape folded downwardly from the outer periphery of the top surface 17A, and is integrally formed with the outer wall-side falling region 13B of the convex portion 13 through the connecting portion 20. The top surface 17A of the one vehicle body mounting portion 17 is provided with two bolt receiving holes 17C extending therethrough vertically at respective positions close to the longitudinally opposite ends of the vehicle body mounting portion 17.

The other vehicle body mounting portion 18 is disposed at a position of the outer peripheral edge 12D of the polygonal annular portion 12 which corresponds to the ninth, tenth, eleventh and twelfth sides 12D9, 12D10, 12D11 and 12D12. The other vehicle body mounting portion 18 is connected to the outer wall-side falling region 13B of the convex portion 13 through a connecting portion 21 (described later).

The other vehicle body mounting portion 18 is formed as a planar portion extending in a direction away from the annular portion 12 as a whole. That is, the other vehicle body mounting portion 18 has a top surface 18A comprising a horizontally extending flat surface and an arcuate folded surface 18B folded downwardly from the outer periphery of the top surface 18A and is integrally formed with the outer wall-side falling region 13B of the convex portion 13 through the connecting portion 21. The top surface 18A of the other vehicle body mounting portion 18 is provided with two bolt receiving holes 18C at respective positions close to the longitudinally opposite ends of the vehicle body mounting portion 18.

Here, as shown in FIG. 3, the vehicle body mounting portion 17 is formed so that the length dimension between one side end edge 17D in the longitudinal direction of the vehicle body mounting portion 17 and the other side end edge 17E thereof is smaller than the length dimension between the first and eighth sides 12D1 and 12D8, which form the outer peripheral edge 12D of the annular portion 12. In a plan view from above of the bracket 11, the one side end edge 17D of the vehicle body mounting portion 17 is contiguous with the first side 12D1 of the annular portion 12, and the other side end edge 17E of the vehicle body mounting portion 17 is contiguous with the sixth side 12D6 of the annular portion 12.

On the other hand, the vehicle body mounting portion 18 is formed so that the length dimension between one side end edge 18D in the longitudinal direction of the vehicle body mounting portion 18 and the other side end edge 18E thereof is smaller than the length dimension between the first and eighth sides 12D1 and 12D8, which form the outer peripheral edge 12D of the annular portion 12. In a plan view from above of the bracket 11, the one side end edge 18D of the vehicle body mounting portion 18 is contiguous with the thirteenth side 12D13 of the annular portion 12, and the other side end edge 18E of the vehicle body mounting portion 18 is contiguous with the eighth side 12D8 of the annular portion 12.

Accordingly, the two vehicle body mounting portions 17 and 18, which are provided at the outer peripheral side of the annular portion 12, are disposed at respective positions which are asymmetric to each other with respect to the annular portion 12. That is, as shown in FIG. 3, let us assume that a center line O-O is a line that is parallel to a straight line A-A passing through the centers of the bolt receiving holes 17C in the one vehicle body mounting portion 17 and a straight line B-B passing through the centers of the bolt receiving holes 18C in the other vehicle body mounting portion 18 and that passes through the distance center between the straight line A-A and the straight line B-B. On this assumption, the two vehicle body mounting portions 17 and 18 are disposed not line-symmetrically but asymmetrically to each other with respect to the center line O-O. With this structure, the vehicle body mounting portions 17 and 18 can be suppressed from vibrating about the center line O-O.

The two vehicle body mounting portions 17 and 18 are secured to the frame 2A of the vehicle body 2 by threadedly engaging bolts 19, which are inserted through the bolt receiving holes 17C and 18C, with bolt holes (internally threaded holes) 2B, from below, which are formed in the frame 2A. Accordingly, the bracket 11 is secured to the frame 2A of the vehicle body 2 by using the bolts 19 in such a way that the top surfaces 17A and 18A of the vehicle body mounting portions 17 and 18 are abutted against the bottom surface of the frame 2A (see FIG. 2).

One connecting portion 20 is provided at a corner where the outer peripheral edge 12D of the annular portion 12 and the one vehicle body mounting portion 17 intersect each other, and more specifically, at a corner where the distal end of the outer wall-side falling region 13B of the convex portion 13, which is provided on the annular portion 12, and the annular portion 12-side end edge of the vehicle body mounting portion 17 intersect each other, to connect between the annular portion 12 and the vehicle body mounting portion 17. Thus, the outer wall-side falling region 13B of the convex portion 13 and the connecting portion 20 and further the top surface 17A of the vehicle body mounting portion 17 are integrated together (see FIG. 6).

The connecting portion 20 extends non-linearly and continuously along the outer peripheral edge 12D of the annular portion 12 in a plan view from above of the bracket 11 (see FIG. 3). That is, the connecting portion 20 is bent polygonally along the second, third, fourth and fifth sides 12D2, 12D3, 12D4 and 12D5, which constitute the outer peripheral edge 12D of the annular portion 12.

Therefore, the connecting portion 20 has three corners 20A, 20B and 20C; a first corner 20A corresponding to the intersection of the second side 12D2 and third side 12D3 of line outer peripheral edge 12D; a second corner 20B corresponding to the intersection of the third side 12D3 and the fourth side 12D4; and a third corner 20C corresponding to the intersection of the fourth side 12D4 and the fifth side 12D5. Thus, the annular portion 12 and the one vehicle body mounting portion 17 are connected together at a corner where the outer peripheral edge 12D of the annular portion 12 and the annular portion 12-side end edge of the one vehicle body mounting portion 17 intersect each other through the non-linear (polygonal) connecting portion 20 having the three corners 20A, 20B and 20C. Consequently, it is possible to increase the flexural rigidity of the joint between the annular portion 12 and the vehicle body mounting portion 17.

That is, if the outer peripheral edge 12D of the annular portion 12 and the vehicle body mounting portion 17 are connected together through a rectilinear connecting portion, for example, vibration having a node at the rectilinear connecting portion is likely to occur. In contrast, when the outer peripheral edge 12D of the annular portion 12 and the vehicle body mounting portion 17 are connected together through the non-linear connecting portion 20, it is possible to suppress a problem that the connecting portion 20 becomes a node of vibration, and hence possible to reduce vibration between the annular portion 12 and the vehicle body mounting portion 17.

The other connecting portion 21 is provided at a corner where the outer peripheral edge 12D of the annular portion 12 and the other vehicle body mounting portion 18 intersect each other, and more specifically, at a corner where the distal end of the outer wall-side falling region 13B of the convex portion 13, which is provided on the annular portion 12, and the annular portion 12-side end edge of the vehicle body mounting portion 18 intersect each other, to connect between the annular portion 12 and the vehicle body mounting portion 18. Thus, the outer wall-side falling region 13B of the convex portion 13 and the connecting portion 21 and further the top surface 18A of the vehicle body mounting portion 18 are integrated together (see FIG. 6).

The connecting portion 21 extends non-linearly and continuously along the outer peripheral edge 12D of the annular portion 12 in a plan view from above or the bracket 11. That is, the connecting portion 21 is bent polygonally along the ninth, tenth, eleventh and twelfth sides 12D9, 12D10, 12D11 and 12D12, which constitute the outer peripheral edge 12D of the annular portion 12.

Therefore, the connecting portion 21 has three corners 21A, 21B and 21C: a fourth corner 21A corresponding to the intersection of the ninth side 12D9 and the tenth side 12D10; a fifth corner 21B corresponding to the intersection of the tenth side 12D10 and the eleventh side 12D11; and a sixth corner 21C corresponding to the intersection of the eleventh side 12D11 and the twelfth side 12D12. Thus, the annular portion 12 and the other vehicle body mounting portion 18 are connected together at a corner where the outer peripheral edge 12D of the annular portion 12 and the annular portion 12-side end edge of the other vehicle body mounting portion 18 intersect each other through the non-linear (polygonal) connecting portion 21 having the three corners 21A, 21B and 21C. Consequently, it is possible to suppress a problem that the connecting portion 21 becomes a node of vibration, and hence possible to increase the flexural rigidity of the joint between the annular portion 12 and the vehicle body mounting portion 18.

Further, the three corners 20A, 20B, 20C, which constitute the one connecting portion 20, and the three corners 21A, 21B and 21C, which constitute the other connecting portion 21, are disposed asymmetrically to each other with respect to the annular portion 12.

That is, as shown in FIG. 3, the three corners 20A, 20B and 20C, which constitute the connecting portion 20, and the three corners 21A, 21B and 21C, which constitute the connecting portion 21, are disposed not line-symmetrically but asymmetrically to each other with respect to the center line O-O, which passes through the annular portion 12. With this structure, the one connecting portion 20 and the other connecting portion 21 can be suppressed from vibrating about the center line O-O.

The pump apparatus 5 according to this embodiment has the above-described structure, and compressed air from the air compressor 6 is supplied to and discharged from the air suspensions 4 through the supply-discharge line 7, the valve unit 8, and the branch lines 9A to 9D, thereby performing vehicle height adjustment through the air suspensions 4.

Here, the air compressor 6 is secured to the frame 2A of the vehicle body 2 through the bracket 11. Therefore, when vibration due to the operation of the air compressor 6 occurs, the vibration is transmitted to the frame 2A of the vehicle body 2 through the bracket 11.

In this regard, the annular portion 12 of the bracket 11 has the convex portion 13 extending from the inner peripheral edge 12C to outer peripheral edge 12D of the annular portion 12. The convex portion 13 has the top region 13A, the outer wall-side falling region 13B, and the inner wall-side falling region 13C and projects upward along the entire circumference of the annular portion 12.

With the above-described structure, the moment of inertia of area of the annular portion 12 can be increased as compared to a structure in which the annular portion 12 is formed in a planar shape, for example. Accordingly, the flexural rigidity of the bracket 11 can be increased without increasing the thickness of the bracket 11, and the natural frequency of the bracket 11 can be increased. As a result, it is possible to suppress resonance of the bracket 11, which occurs when the vibration of the air compressor 6 and the natural frequency of the bracket 11 coincide with each other, and hence possible to suppress transmission of substantial vibration to the vehicle body 2 through the bracket 11.

In this case, because the convex portion 13 is provided over the entire circumference of the annular portion 12, the overall flexural rigidity of the bracket 11 can be increased, and the natural frequency of the bracket 11 can be increased.

Moreover, the outer peripheral edge 12D of the annular portion 12 and the one vehicle body mounting portion 17 are connected to each other through the non-linear connecting portion 20 having the three corners 20A, 20B and 20C, and the outer peripheral edge 12D of the annular portion 12 and the other vehicle body mounting portion 18 are connected to each other through the non-linear connecting portion 11 having the three corners 21A, 21B and 21C.

With the above-described structure, it is possible to suppress a problem that the non-linear connecting portion 20 becomes a node of vibration as compared to a structure in which the outer peripheral edge 12D of the annular portion 12 and the one vehicle body mounting portion 17 are connected to each other through a rectilinear connecting portion, for example. Similarly, it is possible to suppress a problem that the non-linear connecting portion 21 becomes a node of vibration as compared to a structure in which the outer peripheral edge 12D of the annular portion 12 and the other vehicle body mounting portion 18 are connected to each other through a rectilinear connecting portion, for example. As a result, it is possible to suppress vibration between the annular portion 12 and the vehicle body mounting portion 17 and vibration between the annular portion 12 and the vehicle body mounting portion 18, and hence possible to suppress vibration of the bracket 11 transmitted to the vehicle body 2.

Thus, according to this embodiment, the bracket 11, which has an increased flexural rigidity and an increased natural frequency, can be formed by using a single plate material. Accordingly, it is possible to suppress an increase in weight of the bracket 11 as compared to a structure configured to increase the flexural rigidity of the bracket by increasing the plate thickness thereof, for example. Moreover, because it is possible to suppress vibration transmitted from the bracket 11 to the vehicle body 2, there is no need to provide a vibration-isolating member in a mounting region where the bracket 11 and the frame 2A of the vehicle body 2 are secured to each other, or in a mounting region where the bracket 11 and the air compressor 6 are secured to each other, for example. Thus, it is possible to simplify the process of mounting the air compressor 6 onto the vehicle body 2, which contributes to the reduction of manufacturing cost.

It should be noted that the foregoing embodiment exemplarily shows a structure in which the outer peripheral edge 12D of the annular portion 12 and the one vehicle body mounting portion 17 are connected to each other through the polygonal connecting portion 20 having the three corners 20A, 20B and 20C. However, the present invention is not limited to the above. For example, the connecting portion 20 may be formed in a polygonal shape having two corners or four or more corners, or in an arcuate (non-linear) shape having no corner, for example. This also applies to the connecting portion 21, which connects between the outer peripheral edge 12D of the annular portion 12 and the other vehicle body mounting portion 18.

The following is a description of inventions included in the foregoing embodiment. According to the present invention, the bracket is formed by using a single plate material. Thus, the bracket can be manufactures with ease and at a reduced cost, and the manufacturing cost of the bracket can be reduced.

According to the present invention, the annular portion of the bracket is formed in a polygonal shape comprising sides different in length between adjacent ones thereof, and the vehicle body mounting portions of the bracket are disposed at respective positions that face each other across the annular portion and that are asymmetric to each other with respect to the annular portion. With this structure, it is possible to suppress a problem that a connecting portion between the annular portion and each vehicle body mounting portion, becomes a node of vibration, and hence possible to reduce vibration between the annular portion and the vehicle body mounting portion. Further, the vehicle body mounting portions, which face each other across the annular portion, can be suppressed from vibrating about a center line passing through the annular portion.

According to the present invention, the convex portion is formed over substantially the entire circumference of the annular portion. With this structure, the moment of inertia of area of the annular portion can be increased over the entire circumference thereof, and the flexural rigidity of the annular portion can be increased. As a result, it is possible to increase the overall natural frequency of the bracket, and hence possible to suppress the bracket from vibrating sympathetically with vibration of the pump.

According to the present invention, the convex portion is formed in a trapezoidal shape from a top region flat over the entire circumference thereof, an outer wall-side falling region falling from the outer side of the top region to form an outer wall surface, and an inner wall-side falling region falling from the inner side of the top region to form an inner wall surface. The connecting portion is provided between the distal end of the outer wall-side falling region and each vehicle body mounting portion. With this structure, the moment of inertia of area of the convex portion can be increased, and the flexural rigidity of the annular portion can be increased.

According to the present invention, each vehicle body mounting portion is formed as a planar portion extending in a direction a way from the annular portion. Thus, when each vehicle body mounting portion is secured to a vehicle body, an appropriate distance can be maintained between the pump, which is secured to the inner peripheral side of the annular portion, and the vehicle body.

According to the present invention, the pump is an air compressor producing compressed air to be supplied to an air suspension provided between the vehicle body and a wheel of the vehicle. Accordingly, vehicle height adjustment can be performed by supplying and discharging compressed air from the pump, which is secured to the vehicle body through the bracket, to and from the air suspension.

Although only some exemplary embodiments of this invention have been described above, those skilled in the art will readily appreciate that various changes or improvements can be made to the exemplary embodiments without materially departing from the novel teaching and advantages of this invention. Accordingly, all such modifications are intended to be included within the scope of this invention. The foregoing embodiments may be combined at will.

The present application claims priority to Japanese Patent Application No. 2014-260552 filed on Dec. 24, 2014. The entire disclosure of Japanese Patent Application No. 2014-260552 filed on Dec. 24, 2014 including specification, claims, drawings and summary is incorporated herein by reference in its entirety.

LIST OF REFERENCE SIGNS

2: vehicle body; 4: air suspension; 5: pump apparatus; 6: air compressor (pump); 11: bracket; 12: annular portion; 12C: inner peripheral edge; 12D: outer peripheral edge; 13: convex portion; 13A: top region; 13B: outer wall-side falling region; 13C: inner wall-side falling region; 14, 15, 16: compressor mounting portion; 17, 18: vehicle body mounting portion; 20, 21: connecting portion.

The invention claimed is:

1. A vehicular pump apparatus comprising:
 a pump compressing a fluid; and
 an annular bracket;
 the bracket including:
 an annular portion to which the pump is secured, the annular portion being provided at an inner peripheral side of the bracket;
 a plurality of vehicle body mounting portions to be connected to a vehicle body, the vehicle body mounting portions being provided at an outer peripheral side of the bracket; and
 a connecting portion provided between each of the vehicle body mounting portions and the annular portion;
 the annular portion of the bracket having a convex portion of convex cross-sectional shape provided along the annular portion;
 the connecting portion between each of the vehicle body mounting portions and the annular portion having a non-linear shape;

the annular portion of the bracket being formed in a polygonal shape comprising sides different in length between adjacent ones thereof;

the vehicle body mounting portions of the bracket being disposed at respective positions that face each other across the annular portion and that are asymmetric to each other with respect to the annular portion.

2. The vehicular pump apparatus of claim 1, wherein the bracket is formed by using a single plate material.

3. The vehicular pump apparatus of claim 2, wherein the convex portion is formed in a trapezoidal shape from a top region flat over an entire circumference thereof, an outer wall-side falling region falling from an outer side of the top region to form an outer wall surface, and an inner wall-side falling region falling from an inner side of the top region to form an inner wall surface;

the connecting portion being provided between a distal end of the outer wall-side falling region and each of the vehicle body mounting portions.

4. The vehicular pump apparatus of claim 1, wherein the convex portion is formed in a trapezoidal shape from a top region flat over an entire circumference thereof, an outer wall-side falling region falling from an outer side of the top region to form an outer wall surface, and an inner wall-side falling region falling from an inner side of the top region to form an inner wall surface;

the connecting portion being provided between a distal end of the outer wall-side falling region and each of the vehicle body mounting portions.

5. The vehicular pump apparatus of claim 1, wherein each of the vehicle body mounting portions is formed as a planar portion extending in a direction away from the annular portion.

6. The vehicular pump apparatus of claim 1, wherein the pump is an air compressor producing compressed air to be supplied to an air suspension provided between the vehicle body and a wheel of a vehicle.

7. A vehicular pump apparatus comprising:
a pump compressing a fluid; and
an annular bracket;
the bracket including:

an annular portion to which the pump is secured, the annular portion being provided at an inner peripheral side of the bracket;

a plurality of vehicle body mounting portions to be connected to a vehicle body, the vehicle body mounting portions being provided at an outer peripheral side of the bracket; and a connecting portion provided between each of the vehicle body mounting portions and the annular portion;

the annular portion of the bracket having a convex portion of convex cross-sectional shape provided along the annular portion;

the connecting portion between each of the vehicle body mounting portions and the annular portion having a non-linear shape;

the convex portion being formed over substantially an entire circumference of the annular portion.

8. The vehicular pump apparatus of claim 7, wherein the convex portion is formed in a trapezoidal shape from a top region flat over an entire circumference thereof, an outer wall-side falling region falling from an outer side of the top region to form an outer wall surface, and an inner wall-side falling region falling from an inner side of the top region to form an inner wall surface;

the connecting portion being provided between a distal end of the outer wall-side falling region and each of the vehicle body mounting portions.

9. A vehicular bracket used to secure a pump to a vehicle body of a vehicle, the pump being an air compressor producing compressed air to be supplied to an air suspension provided between the vehicle body and a wheel of the vehicle, the bracket having at its inner peripheral side an annular portion to which the pump is secured and at its outer peripheral side a plurality of vehicle body mounting portions to be connected to the vehicle body;

wherein the annular portion has a convex portion of convex cross-sectional shape provided along the annular portion, and a connecting portion between each of the vehicle body mounting portions and the annular portion has a non-linear shape.

* * * * *